United States Patent
Manholm et al.

(10) Patent No.: US 9,960,825 B2
(45) Date of Patent: May 1, 2018

(54) METHOD, CONTROL SYSTEM AND COMMUNICATION SYSTEM FOR ADAPTING BEAM PATTERNS

(71) Applicant: Telefonaktiebolaget LM Ericsson (publ), Stockholm (SE)

(72) Inventors: Lars Manholm, Göteborg (SE); Sven Petersson, Sävedalen (SE); Stefan Johansson, Romelanda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days. days.

(21) Appl. No.: 15/548,300

(22) PCT Filed: Mar. 6, 2015

(86) PCT No.: PCT/EP2015/054725
§ 371 (c)(1),
(2) Date: Aug. 2, 2017

(87) PCT Pub. No.: WO2016/141954
PCT Pub. Date: Sep. 15, 2016

(65) Prior Publication Data
US 2018/0026683 A1    Jan. 25, 2018

(51) Int. Cl.
*H03D 5/00* (2006.01)
*H04B 7/0452* (2017.01)
*H04B 7/06* (2006.01)

(52) U.S. Cl.
CPC ......... *H04B 7/0452* (2013.01); *H04B 7/0617* (2013.01)

(58) Field of Classification Search
CPC ... H04L 27/362; H04L 27/02; H04L 27/2071; H04B 7/0408; H04B 7/0617; H04B 7/0413; H04B 7/0693; H04B 7/0696; H04Q 3/2605; H04Q 1/246
USPC .......... 375/267, 260; 343/703, 893; 455/509
See application file for complete search history.

(56) References Cited

U.S. PATENT DOCUMENTS

2002/0187812 A1   12/2002   Guo
2012/0214530 A1*   8/2012   Molnar ................. H01Q 1/246
  455/513
2014/0269967 A1*   9/2014   Tsutsui ................ H04B 7/0417
  375/267

(Continued)

OTHER PUBLICATIONS

Lingpei, Zhang et al., "The Adaptive Beam Forming Algorithm Based on MIMO Array with Particle Swarm Optimization," International Conference on Educational and Information Technology (ICEIT), Sep. 17-19, 2010, Chongqing, China, IEEE, pp. V1-397 to V1-401.

(Continued)

*Primary Examiner* — Khai Tran
(74) *Attorney, Agent, or Firm* — Withrow & Terranova, PLLC

(57) ABSTRACT

The present invention relates to a method and control system for adapting beam patterns generated by at least one array antenna serving one or more users. Each array antenna comprising multiple antenna subarrays within an aperture and is configured to provide coverage to a service area using a set of fixed beams, each fixed beam having a beam pattern covering a portion of the service area which beam pattern is generated by applying weights to the antenna subarrays.

16 Claims, 10 Drawing Sheets

(56) References Cited

U.S. PATENT DOCUMENTS

2014/0348255 A1    11/2014  Lorca Hernando

OTHER PUBLICATIONS

International Search Report and Written Opinion for International Patent Application No. PCT/EP2015/054725, dated Oct. 30, 2015, 10 pages.

* cited by examiner

METHOD, CONTROL SYSTEM AND COMMUNICATION SYSTEM FOR ADAPTING BEAM PATTERNS

This application is a 35 U.S.C. § 371 national phase filing of International Application No. PCT/EP2015/054725, filed Mar. 6, 2015, the disclosure of which is incorporated herein by reference in its entirety.

TECHNICAL FIELD

The disclosure relates to a method for adapting beam patterns generated by an array antenna as defined in the preamble of the independent claim 1. The invention also relates to a control system for adapting beam patterns generated by an array antenna and a communication system comprising such a control system.

BACKGROUND

A fixed multi-beam antenna system is one of several possible implementations in telecommunication systems. The principle is to have a fairly large set of fixed beams where each beam covers a part of the service area for a node and all beams together covers the complete desired service area with two orthogonal polarizations.

In such systems downlink and uplink transmission between a UE and the node can be scheduled by making use of a subset of beams that are the most appropriate, i.e. the beams that gives the best link budget and has the best SIR. At the same time it is also possible to schedule other UE's by making use of another sub-set of beams assuming that the interference can be kept sufficiently low i.e. that the spatial isolation between the different subsets of beams is sufficient.

One way to realize a multi-beam antenna system is to make use of array antennas and having each beam corresponding to a set of element excitations (element weights).

One issue with a fixed multi-beam system, as in all systems, is that a signal will be transmitted and received not only via a desired beam but also via side lobes, i.e. the spatial isolation between beams is dependent on the side lobe levels of the beams. The signal transmitted and received via side lobes will appear as interference to other signals transmitted via other beams and will make simultaneous transmission to and/or reception from several users (MU-MIMO), or a single user (SU-MIMO), less favorable.

Thus good isolation between the beams requires that each beam has not only the desired coverage area but also low side lobe levels outside the coverage area in order to give low interference to the other beams.

When using array antennas, the element weights for each beam should be determined for desired beam coverage as well as for low side lobe levels. However, in general the requirement of low side levels means a penalty in reduced aperture efficiency. In down link also a poor PA utilization will be an issue in the case of an active array antenna realization.

SUMMARY

One object with the present invention is to provide a method for adapting beam patterns in an antenna system with one or more users having improved spatial isolation and signal interference ratio compared to prior art techniques.

The object may be achieved with a method for adapting beam patterns generated by an array antenna serving one or more users using multiple spatial MIMO streams. The array antenna comprises multiple subarrays within an aperture. The array antenna is configured to provide coverage to a service area using a set of fixed beams. Each fixed beam has a beam pattern only covering a portion of the service area, and the beam pattern is generated by applying weights to the antenna subarrays.

The method comprises:
a) generating several sets of weights for each fixed beam. Each set of weights generates similar coverage in a main direction, i.e. the main lobe, and side lobe levels lower than one or more thresholds in other directions than the main direction. The other directions corresponding to the main direction of a limited number of fixed beams belonging to the set of fixed beams,
b) storing the sets of weights for each fixed beam,
c) receiving information from a scheduler regarding at least two fixed beams intended to be used for communication purposes, wherein a first fixed beam provides coverage to a first user and a second fixed beam provides coverage to a second user,
d) selecting a set of weights from the stored sets of weights for the first fixed beam based on the side lobe levels in the main direction of the second fixed beam, and a set of weights from the stored sets of weights for the second fixed beam based on the side lobe levels in the main direction of the first fixed beam to minimize interference between the first and second beams, and
e) applying the selected set of weights for each fixed beam intended for communication to the antenna subarrays when generating the respective beam pattern.

The object may also be achieved by a control system for adapting beam patterns generated by an array antenna serving one or more users using multiple spatial MIMO streams. The array antenna comprises multiple antenna subarrays (comprising one or more antenna elements) within an aperture. The array antenna is configured to provide coverage to a service area using a set of fixed beams. Each fixed beam has a beam pattern only covering a portion of the service area, and the beam pattern is generated by applying weights to the antenna subarrays. The control system comprises:
  a memory configured to store several sets of weights for each fixed beam. Each set of weights is configured to generate similar coverage in a main direction, i.e. the main lobe, and side lobe levels lower than one or more thresholds in other directions than the main direction. The other directions corresponding to the main direction of a limited number of fixed beams belonging to the set of fixed beams, and
  a processing unit configured to:
    receive information regarding at least two fixed beams intended to be used for communication purposes, wherein a first fixed beam and a second fixed beam provides coverage to the one or more users,
    select a set of weights from the memory for the first fixed beam based on the side lobe levels in the main direction of the second fixed beam, and a set of weights from the memory for the second fixed beam based on the side lobe levels in the main direction of the first fixed beam to minimize interference between the first and second fixed beams, and
    provide information regarding set of weights for each fixed beam intended for communication to be applied to the antenna subarrays when generating the respective beam pattern.

An advantage with the present invention is that performance for MU-MIMO can be improved by adapting beam patterns, especially in the side lobe region, jointly with scheduling decisions.

Another advantage with the present invention is it allows for a more efficient use of the antenna aperture as well as an improved PA utilization.

Further objects and advantages will be apparent for a skilled person from the detailed description and the drawings.

BRIEF DESCRIPTION OF THE DRAWINGS

FIG. 4b shows power utilization and phase for the one-dimensional array antenna in FIG. 4a.

FIG. 5b shows power utilization and phase for the one-dimensional array antenna in FIG. 5a.

FIG. 6b shows power utilization and phase for the one-dimensional array antenna in FIG. 6a.

FIG. 7b shows power utilization and phase for the one-dimensional array antenna in FIG. 7a.

FIG. 10b shows power utilization for the two-dimensional rectangular array antenna in FIG. 10a.

FIG. 11b shows power utilization the two-dimensional rectangular array antenna in FIG. 11a.

DETAILED DESCRIPTION

Figure 1:
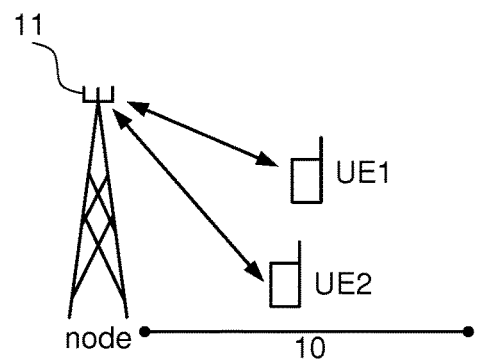
FIG. 1 shows a node in a telecommunication system illustrating communication between multiple users served by the node according to prior art.

The description following will mostly be focusing on the case of a one-dimensional (1D) antenna for the purpose of simplifying the description (as well as drawings) but the there are no limitations in the concept to 1D. The ideas and methods are in fact even more beneficial for two-dimensional (2D) antennas, as illustrated in connection with FIGS. 9-11b.

The array antenna comprises multiple subarrays, $N_{tot}$, for example arranged as $N_{tot}=M\times N$ antenna subarrays (each subarray comprising one or more antenna elements) within an aperture; M and N are integers equal or larger than one, M, N≥1. The description to follow is targeting the M×N topology whereas the principles apply for other antenna topologies as well.

The invention is related to "fixed multi-beam" systems, and should be interpreted as a functional description where transmission and/or reception is performed via one or more beams selected from a set of beams, each beam covering a portion, i.e. only part of the service area. The beams are fixed in the sense that properties are in principle static over time. "Fixed beams" should not be interpreted as an implementation description such as using a Butler matrix or similar.

The present invention relates to a fixed multi-beam antenna system where a flexible fixed beam concept is introduced in order to improve the prerequisites for good spatial isolation between the different subsets of beams and thus the SINR for scheduling for instance MU-MIMO. The invention is also applicable for SU-MIMO with several spatial data streams, via different paths, to the same user, or a combination of SU/MU-MIMO. Thus, although the invention is applicable both for MU-MIMO, SU-MIMO or a combination of them, the description illustrates the invention by MU-MIMO.

The SINR for selected beam combinations may be improved by slightly modifying the beam forming weights such that, for a given beam, the signal strength in the main beam is in principle unchanged whereas the interference spread in the directions of other simultaneously used beams are lower by a reduced side lobe level (SLL) in these directions.

The basic idea is to let each beam have several sets of weights where each set generates the same, or at least similar, beam coverage in a main direction and where the difference between the sets of weights is that they have different areas, or directions, with low side lobe levels. Thus the scheduler can make use of that once decided which UE's to be scheduled in which sets of beams to improve the spatial isolation and the SIR.

By adapting beam patterns (using different sets of weights), especially in the side lobe region, jointly with scheduling decisions, performance for MU-MIMO can be improved.

The proposed solution can be used, not only for MU-MIMO, but also to improve performance for users in different, typically adjacent, cells, as illustrated in connection with FIG. 9.

The flexible fixed beams concept allows for a more efficient use of the antenna aperture as well as an improved PA utilization. This can be achieved since for each set of weights the side lobe levels do not need to be suppressed over the full service area, but only at parts of the service area where the side lobe level is below a predetermined threshold, i.e. in directions other than the main direction. It is possible to generate set of weights for the same fixed beam that has a side lobe level below one or more thresholds in the same direction. For two-dimensional array antennas (as illustrated in connection with FIGS. 10a-b and 11a-b) the SLL outside the cardinal cuts are much lower than in the cardinal cuts. There is thus less need for applying means for SLL suppression for users in directions outside the cardinal cuts, allowing better PA utilization and aperture efficiency than traditional SLL suppression techniques.

FIG. 1 shows a node in a telecommunication system according to the prior art. Typically, the node is serving users (illustrated by a first user equipment UE1 and a second user equipment UE2) in a service area 10 determined by the antenna arrangement 11 implemented in the node. Simultaneous communication, as illustrated by arrows 12 and 13 between the node and the user equipment UE1 and UE2, may occur and when using a fixed multi-beam antenna system, as described in the background, downlink and uplink transmission between the UE1 and the node can be scheduled by making use of a subset beams that are the most appropriate, i.e. the beams that gives the best link budget and has the best SIR. However, it might be difficult to schedule UE2 at the same time using another sub-set of beams since the spatial isolation between the different subsets of beams may not be sufficient.

Figure 2:
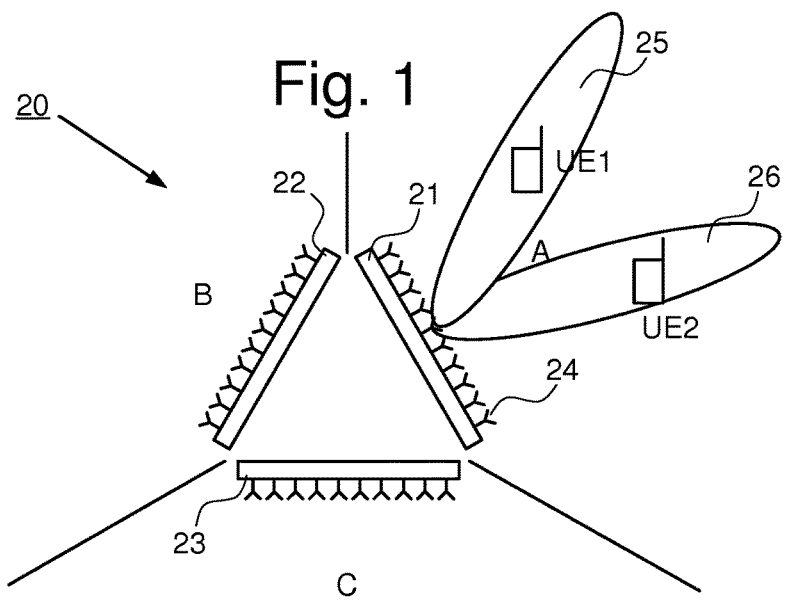
FIG. 2 shows an antenna arrangement configured to implement the invention.

FIG. 2 shows a node 20 that is realized by three linear array antennas 21, 22 and 23 in the horizontal plane (1 dimensional example with ten antenna arrays), where each linear array antenna serves a sector of 120 degrees, denoted A, B and C. UE1 and UE2 are situated within the same sector A served by the linear array antenna 21. In this example, each array antenna consists of ten active subarrays 24 (for illustrative purpose, each subarray is shown as a single antenna element) and a half power beam width of 90 degrees for the antenna subarrays is assumed.

Figure 4A:
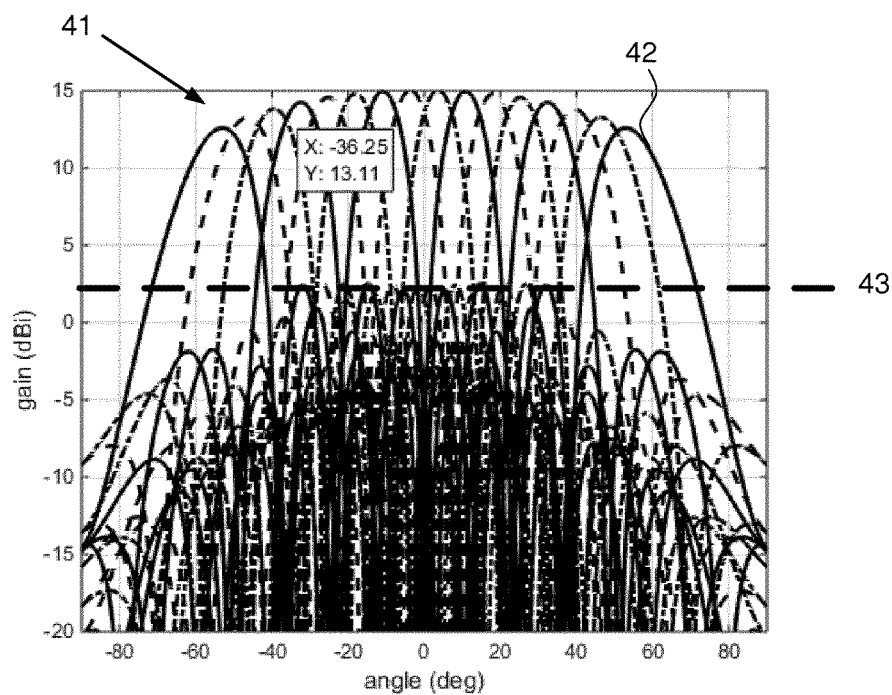
FIG. 4a shows a set of beams via a one-dimensional array antenna with uniform excitations.
Figure 4B:
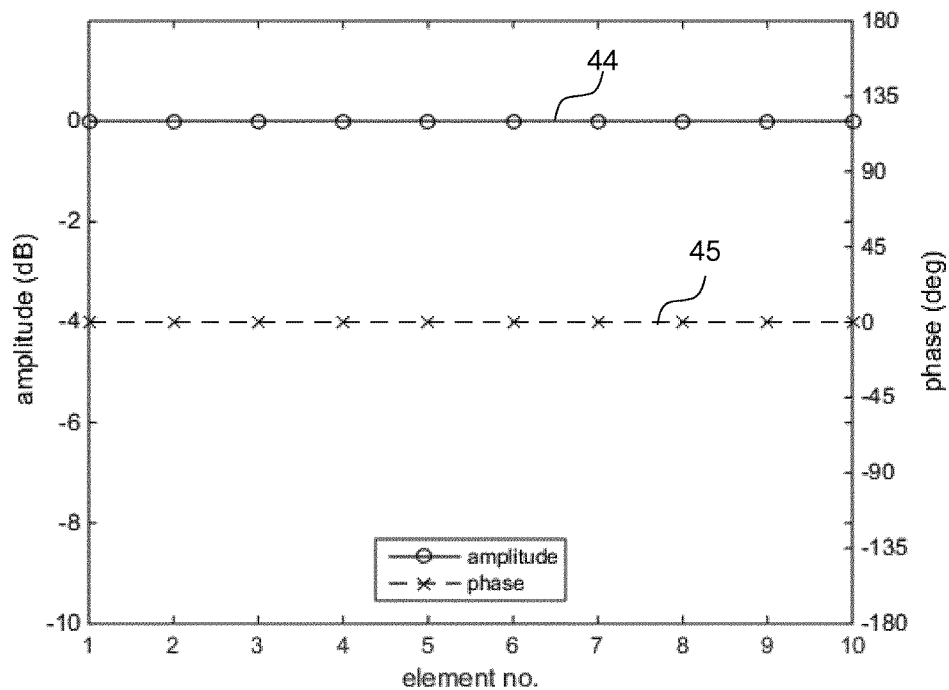

Each array antenna is assumed to have sixteen fixed beams in different directions for covering the respective 120 degree sector, beam 25 provides coverage for UE1 and beam 26 provides coverage for UE2. FIGS. 4a and 4b show the sixteen fixed beams based on uniform amplitude distribution with proper phase to get the fixed beams pointing in the appropriate direction. With the uniform amplitude distribution, 100% aperture efficiency and 100% PA utilization in down link is achieved.

Figure 3:
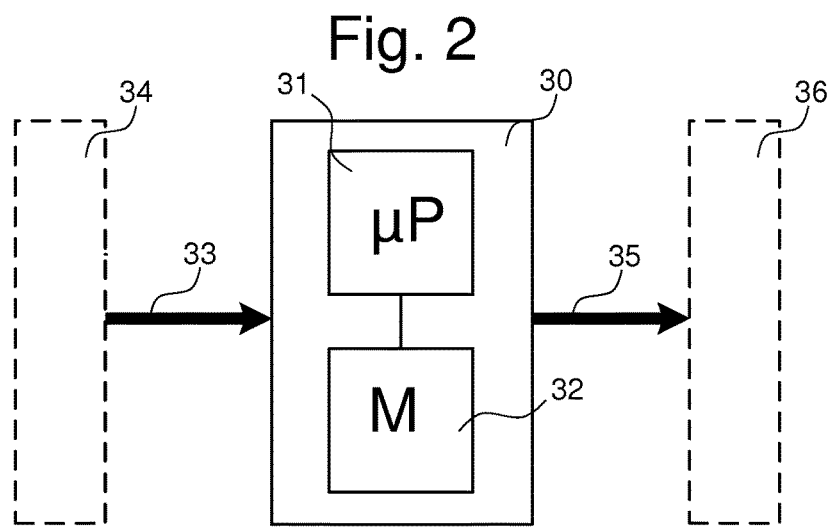
FIG. 3 illustrates a control system configured to implement the invention.

FIG. 3 illustrates a control system 30 configured to implement the invention. The control system comprises a processing unit 31 configured to be in connection with a memory 32. The processing unit 31 of the control system 30 is also configured to receive information 33, e.g. from a scheduler 34, and configured to provide antenna control information 35, which is used when communicating with users through an array antenna 36.

The purpose of the control system 30 is to adapt beam patterns generated by the array antenna 36 serving one or more users, which may be simultaneous users in a MU-MIMO system. The array antenna comprises multiple antenna subarrays within an aperture. The array antenna 36 is configured to provide coverage to a service area using a set of fixed beams, each fixed beam having a beam pattern covering a portion of the service area, e.g. a sector for a one-dimensional array antenna, which beam pattern is generated by applying weights to the antenna subarrays.

As mentioned above, the control system comprises a memory 32 and a processing unit 31. The memory 32 is configured to store several sets of weights for each fixed beam. Each set of weights is configured to generate the same, or at least similar, coverage in a main direction, i.e. the main lobe, and side lobe levels lower than one or more thresholds in other directions than the main direction. The other directions correspond to the main direction of a limited number of fixed beams belonging to the set of fixed beams, as illustrated in connection with FIGS. 6a, 7a and 8.

The processing unit 31 is configured to:
  receive information regarding at least two fixed beams 25 and 26 (as illustrated in FIG. 2) intended to be used for communication purposes wherein a first fixed beam 25 provides coverage to a first user UE1 and a second fixed beam 26 provides coverage to a second user UE2. In the case with SU-MIMO, a first beam and a second beam could provide coverage to the same user, e.g. UE1.
  select a set of weights from the memory 32 for the first fixed beam 25 based on the side lobe levels in the main direction of the second fixed beam 26, and a set of weights from the memory 32 for the second fixed beam 26 based on the side lobe levels in the main direction of the first fixed beam 25 to minimize interference between the first and second fixed beams 25 and 26.
  provide information 35 regarding set of weights for each fixed beam intended for communication to be applied to the antenna subarrays when generating the respective beam pattern from the array antenna 36.

FIG. 4a shows a graph illustrating the beam pattern of a set of fixed beams 41, via a one-dimensional array antenna (as described in connection with FIG. 2) with 10 elements with uniform excitations. The x-axis is angle in degrees in the range −60 degrees to +60 degrees, and the y-axis is gain in dBi. When generating a fixed beam, a main lobe 42 and side lobes are also generated being below +2 dBi, which is illustrated by line 43. Each main lobe is above +12 dBi and a side lobe level (SSL) is below −13 dB relative the peak gain of the main beams in the same direction. FIG. 4b shows amplitude at 0.0 dB (line 44) for all ten antenna subarrays in the one-dimensional array antenna 21 in FIG. 2 (on the x-axis); and phase at 0 degrees (line 45) for all ten antenna subarrays in the one-dimensional array antenna 21 in FIG. 2.

Figure 5A:
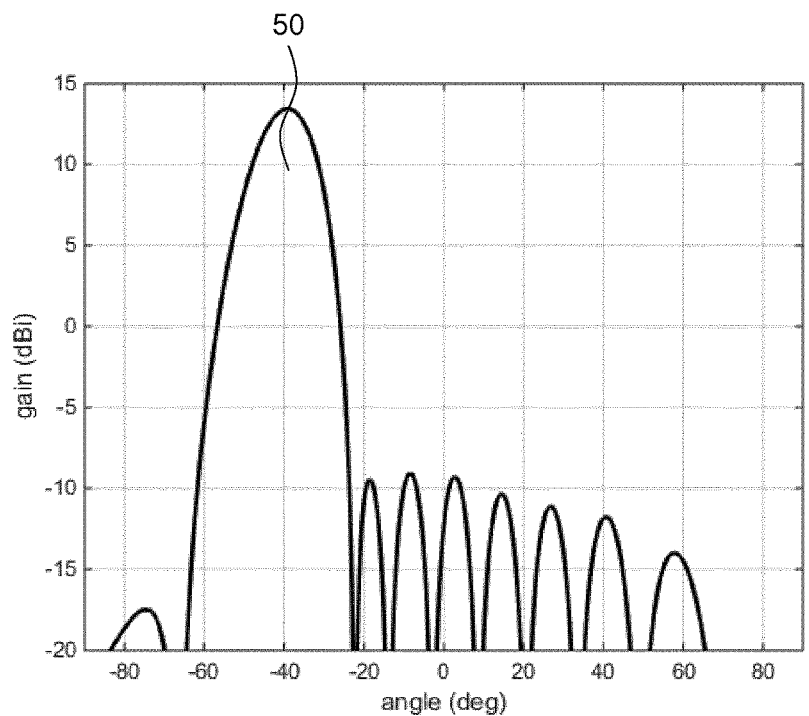
FIG. 5a shows an example for a specific beam formed via a one-dimensional array antenna with amplitude weights according to a Taylor distribution according to prior art.
Figure 5B:
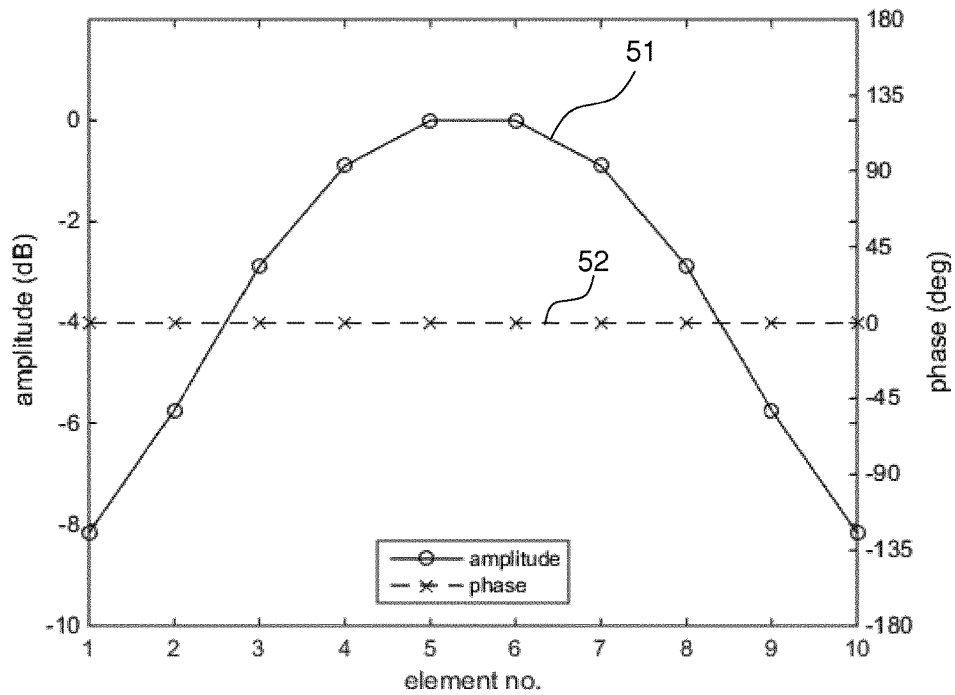

FIG. 5a shows an example for the beam pattern of a third fixed beam 50 at +13 dBi with amplitude weights (line 51), applied to the ten antenna subarrays 24 in the array antenna 21 from FIG. 2, according to a Taylor distribution as shown in FIG. 5b. The side lobes are below −9 dBi and the SSL is −22 dB. The phase is at 0 degrees (line 52) for all ten antenna subarrays in the one-dimensional array antenna 21 in FIG. 2. This corresponds to a 95% (−0.2 dB) aperture efficiency and a PA utilization of 62% (−2.1 dB). The advantage with using a Taylor distribution is that a suitable, but not constant, SSL is achieved in any direction within the service area. Any aperture distribution with fixed side lobe suppression in all directions outside the main beam, as exemplified with the Taylor distribution, will have the same advantage, but also suffer from the drawbacks related to poor PA utilization and aperture efficiency.

Figure 6A:
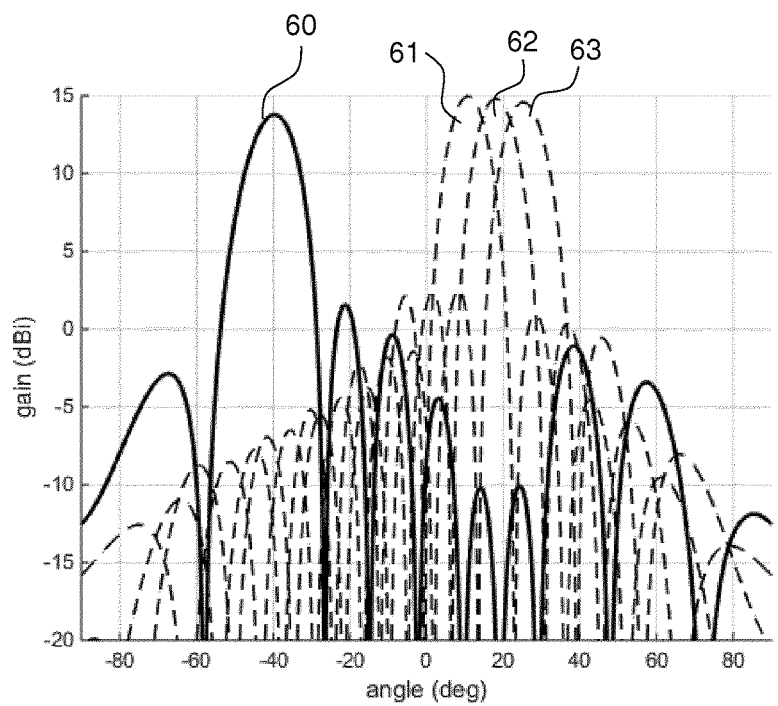
FIG. 6a shows a first example for the specific beam via a one-dimensional array antenna with suppression in a first direction.
Figure 6B:
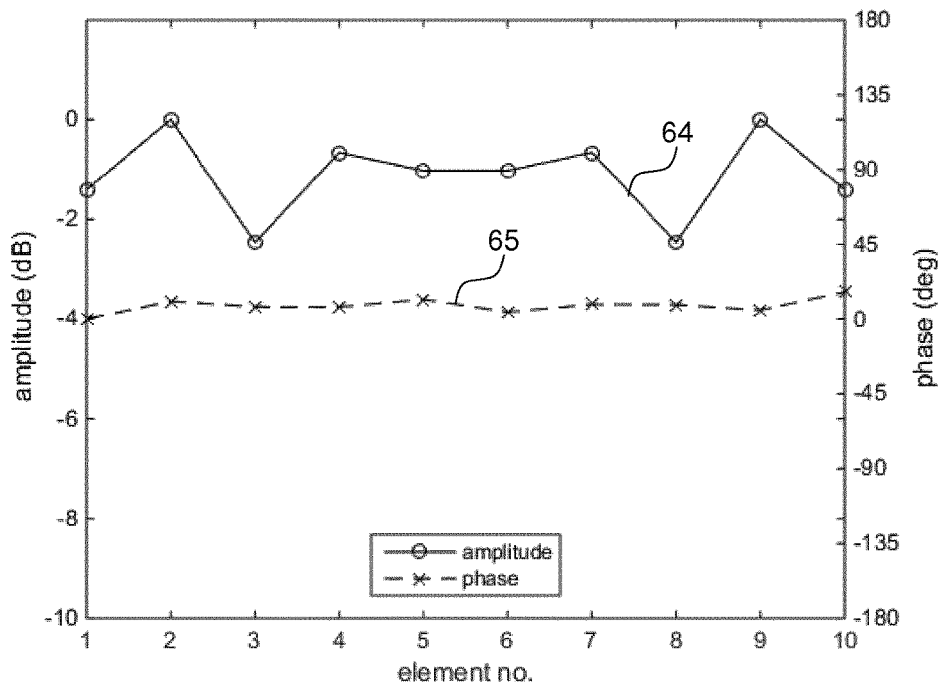

FIG. 6a shows an example for the beam pattern of a third fixed beam 60 at +15 dBi with amplitude and phase weights optimized to achieve −25 dB SLL (side lobes below −10 dBi) at the positions of the tenth 61, eleventh 62 and twelfth 63 fixed beams, relative the peak gain of said beams. FIG. 6b shows varying amplitude (line 64) for all ten antenna subarrays in the one-dimensional array antenna 21 in FIG. 2 (on the x-axis); and varying phase (line 65) for all ten antenna subarrays in the one-dimensional array antenna 21 in FIG. 2. In this case the aperture efficiency is 98.6% (−0.06 dB) and the PA utilization is 79% (−1.0 dB).

Figure 7A:
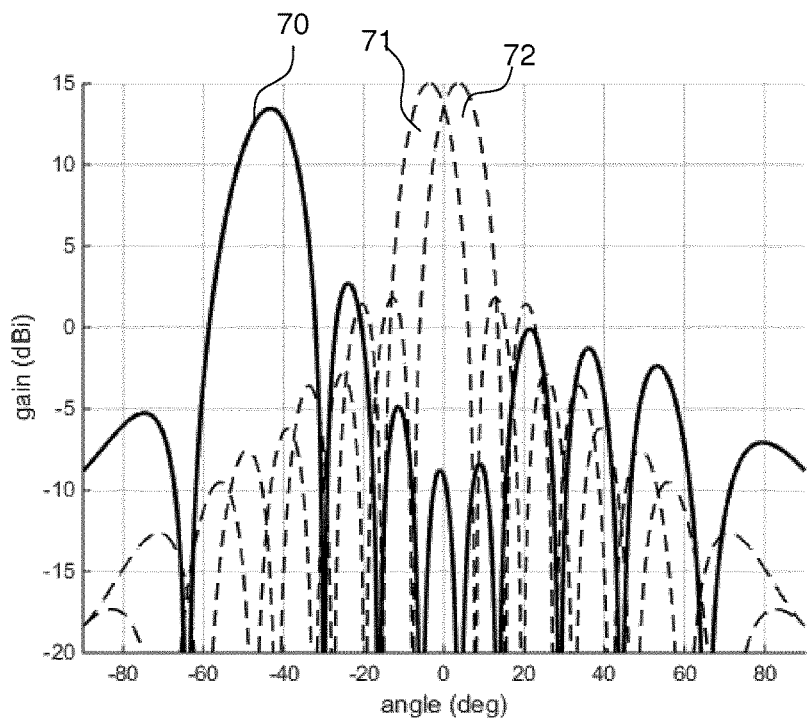
FIG. 7a shows a second example for the specific beam via a one-dimensional array antenna with suppression in a second direction.
Figure 7B:
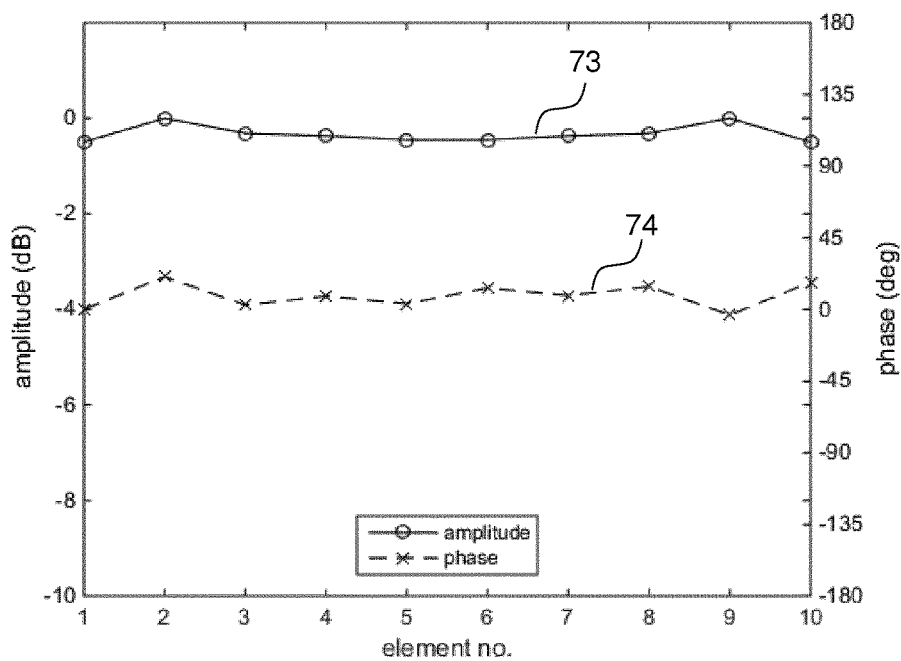

FIG. 7a shows an example for the beam pattern of a third fixed beam 70 at +15 dBi with amplitude weights optimized to achieve −23 dB SLL (side lobes below −8 dBi) at the positions of the eighth 71 and ninth 72 fixed beam, relative the peak gain of said beams. FIG. 7b shows varying amplitude (line 73) for all ten antenna subarrays in the one-dimensional array antenna 21 in FIG. 2 (on the x-axis); and varying phase (line 74) for all ten antenna subarrays in the one-dimensional array antenna 21 in FIG. 2. In this case the aperture efficiency is 98.3% (−0.07 dB) and the PA utilization is 93% (−0.3 dB).

Figure 8:
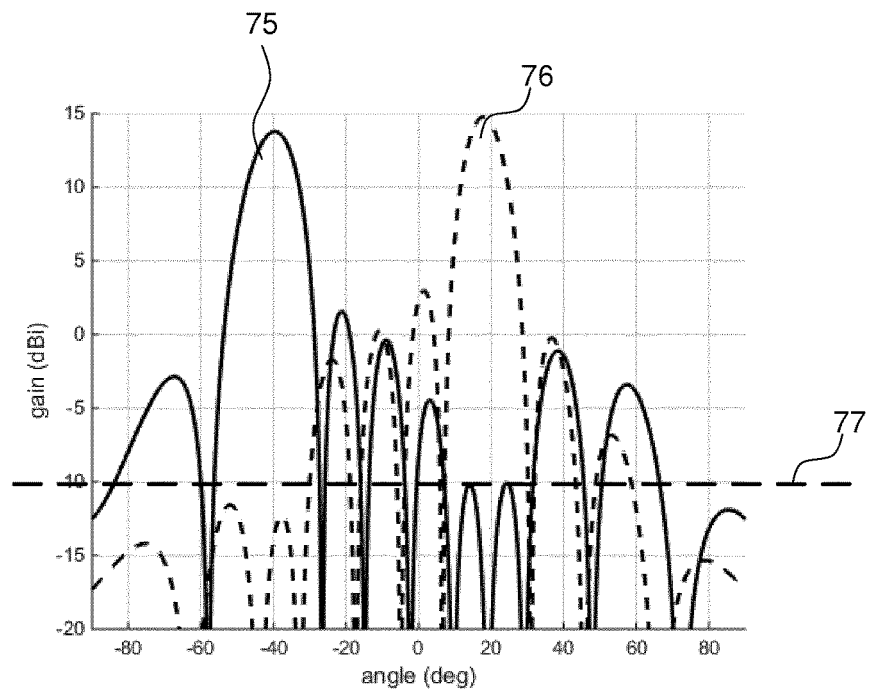
FIG. 8 shows beam patterns illustrating the invention in combination with FIG. 2.

FIG. 8 shows beam patterns illustrating the invention in combination with FIG. 2. UE1 is positioned in a first direction (−40 degrees) corresponding to the third beam 75, and UE2 is positioned in a second direction (+20 degrees) corresponding to eleventh beam 76. The solid line shows the fixed beam (main lobe) in the first direction with side lobes, and the dashed line shows the fixed beam (main lobe) in the second direction with side lobes.

By selecting the appropriate set of weights for the fixed beam in the first direction, the side lobe level in the second direction is below −10 dBi, as illustrated by the line 77. Also, by selecting the appropriate set of weights for the fixed beam in the second direction, the side lobe level in the first direction is below −10 dBi. Thus, simultaneous communication with UE1 and UE2 may be achieved with improved SIR since the side lobes are reduced to below −25 dB relative peak in the direction of the other beam.

Figure 9:
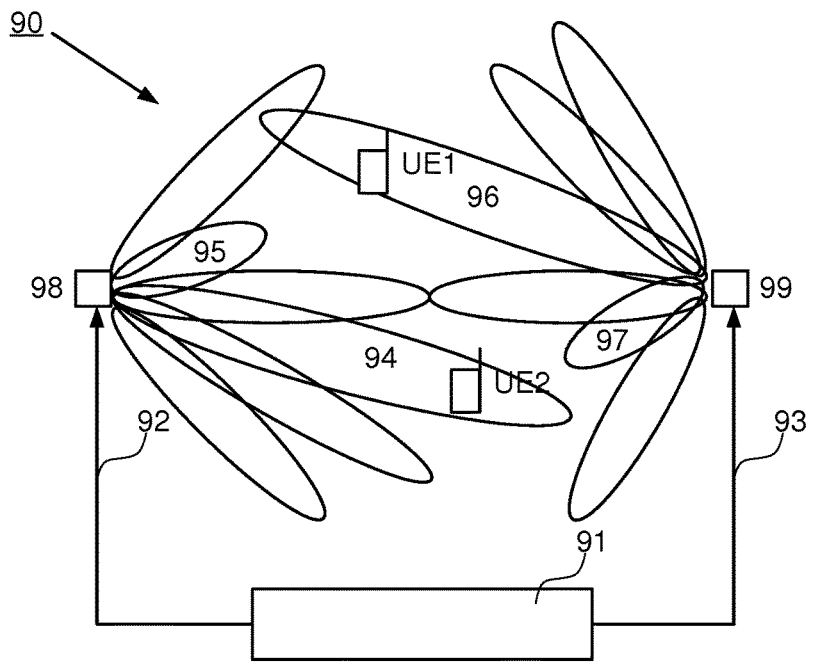
FIG. 9 shows an example illustrating the invention for users in different cells.

FIG. 9 shows an example of a telecommunication system 90 illustrating the invention for users in different cells. The system 90 comprises in this example two nodes (98 and 99) serving users (UE1 and UE2). A common scheduler 91 is in communication with the nodes, as indicated by arrows 92 and 93. In order to improve the signal reception and facilitate simultaneous communication with UE1 and UE2, the scheduler 91 sends information to each node indicating which user to provide coverage to and in what direction to suppress side lobes to minimize interference.

A control system, as described in connection with FIG. 3, may be implemented in each node. In the first node 98, the control unit selects a set of weights that provides coverage for UE2 (main lobe 94) and suppresses side lobes in the direction of UE1 (side lobe 95). Similarly, in the second node 99, the control unit selects a set of weights that provides coverage for UE1 (main lobe 96) and suppresses side lobes in the direction of UE2 (side lobe 97).

It is of course possible to use a common control unit integrated with the scheduler 91 that provides antenna control information to an antenna control system of each node. However, a memory associated with each array antenna has to be provided to store information regarding the sets of weights that can be used to provide coverage. The memory may be implemented in each node (as illustrated in FIG. 3) or be common for the nodes, e.g. integrated together with the scheduler 91.

The control system is configured to adapt the beam patterns generated by at least one array antenna (an example with one array antenna is shown in FIG. 3 and an example with two array antennas is shown in FIG. 9) serving one or more users. Each array antenna comprising multiple antenna subarrays within an aperture and is configured to provide coverage to a service area using a set of fixed beams. Each fixed beam having a beam pattern covering a portion of the service area, such as a sector for a one-dimensional array antenna, which beam pattern is generated by applying weights to the antenna subarrays.

The control system comprises a memory associated with each array antenna and one processing unit (FIG. 3) or two processing units (FIG. 9). The memory is configured to store several sets of weights for each fixed beam for the associated array antenna, and each set of weights is configured to generate similar coverage in a main direction, i.e. main lobe, and side lobe levels lower than one or more thresholds, e.g. lower than −20 dB in relation to the main lobe, in other directions than the main direction, wherein the other directions corresponds to the main direction of a limited number of fixed beams belonging to the set of fixed beams.

The at least one processing unit is configured to:
receive information, for instance from a scheduler, regarding at least two fixed beams intended to be used for communication purposes, wherein a first fixed beam and a second fixed beam provides coverage to the one or more users. The information may comprise pointing directions in a common coordinate system and other relevant information in case of separate array antennas (as illustrated in FIG. 9).
select a set of weights from the memory for the first fixed beam based on the side lobe levels in the main direction of the second fixed beam, and a set of weights from the memory for the second fixed beam based on the side lobe levels in the main direction of the first fixed beam to minimize interference between the first and second fixed beams, and
provide information regarding set of weights for each fixed beam intended for communication to be applied to the antenna subarrays of the at least one array antenna when generating the respective beam pattern.

At least one set of weights configured to be stored in the memory may have a side lobe level lower than one of the thresholds in a direction within the service area coinciding with the direction of each respective fixed beam other than in the main direction.

The at least one processing unit may be configured to provide the information regarding set of weights for each fixed beam to one antenna control system (FIG. 3) or two antenna control systems (FIG. 9).

The control system and method for adapting the beam pattern may be implemented in a communication system configured to communicate with at least one user within a service area. The communication system comprises:
at least one node with at least one array antenna serving one or more users, each array antenna comprising multiple antenna subarrays within an aperture and is configured to provide coverage to a service area using a set of fixed beams, each fixed beam having a beam pattern covering a portion of the service area which beam pattern is generated by applying weights to the antenna subarrays of the at least one array antenna,
a scheduler configured to provide information regarding at least two fixed beams, wherein a first fixed beam and a second fixed beam provides coverage to the one or more users, and
a control system as described above.

Figure 10A:
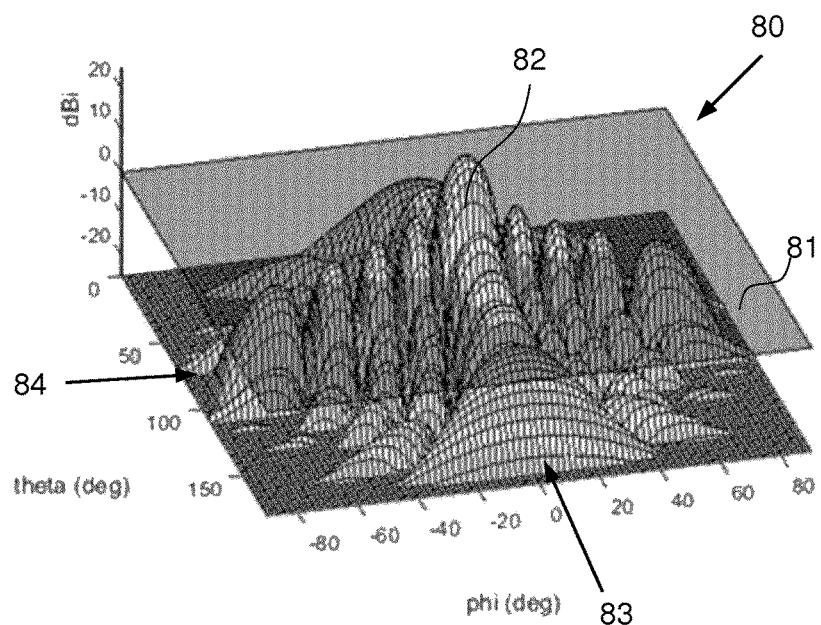
FIG. 10a shows a beam pattern for a beam formed via a two-dimensional rectangular array antenna with uniform amplitude distribution.
Figure 10B:
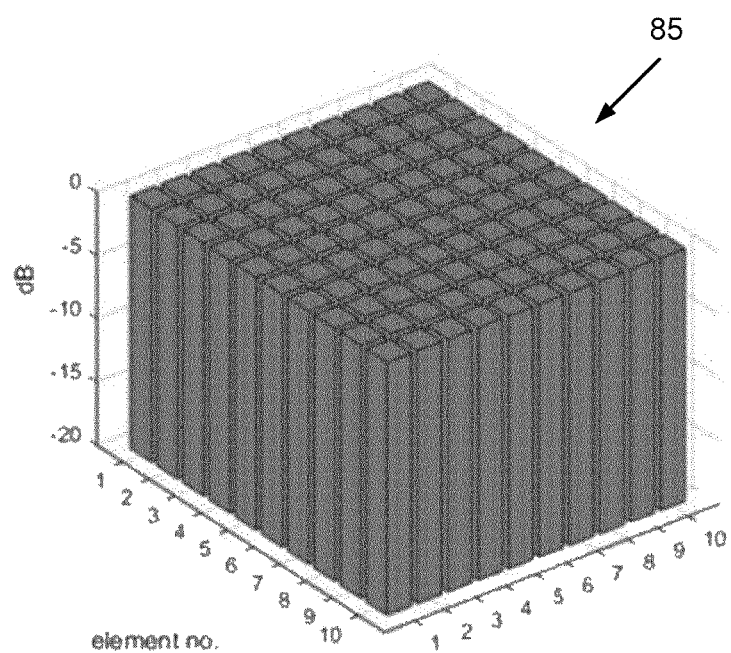

To further illustrate the benefits of the concept, a two-dimensional antenna with a two-dimensional service area is shown. In FIG. 10a, a beam pattern 80 for a fixed beam is shown, which is formed via a two-dimensional rectangular array antenna consisting of 10×10 active antenna subarrays. The array antenna is fed with uniform amplitude distribution and uniform phase distribution, which means that the aperture efficiency as well as the power amplifier utilization is high, in fact identical to 100%. What can be observed is that the side lobe levels are fairly low over a wide area, cardinal cuts (as indicated by arrows 83 and 84) not included in this area. The shaded plane 81 indicates the −25 dB level relative to the fixed beam peak 82. This means that it is possible to serve multiple, simultaneous users with good isolation as long as they are not located in the cardinal cuts of each other, despite the uniform amplitude taper of the array antenna. The power utilization 85 for each antenna subarray in the array antenna is shown in FIG. 10b.

Figure 11A:
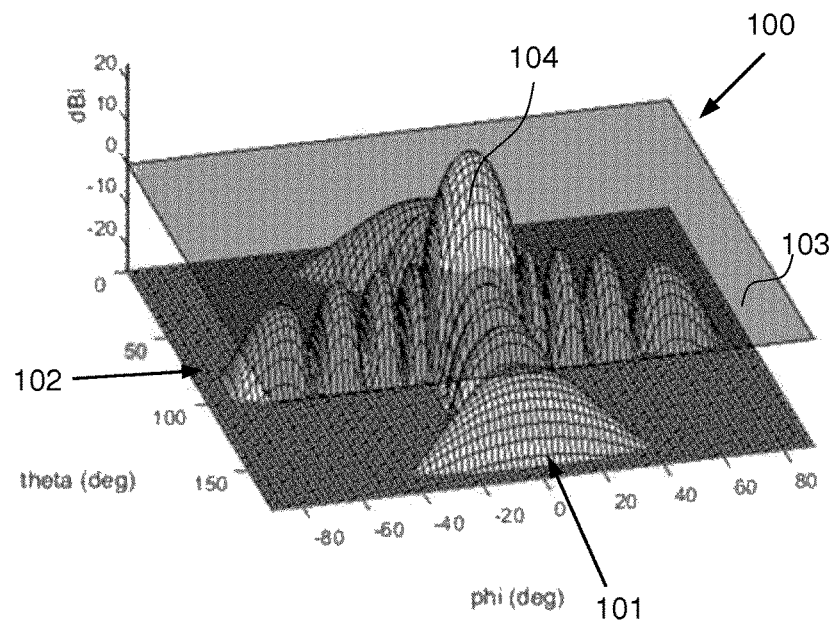
FIG. 11a shows a beam pattern for a beam formed via a two-dimensional rectangular array antenna with Taylor distribution.
Figure 11B:
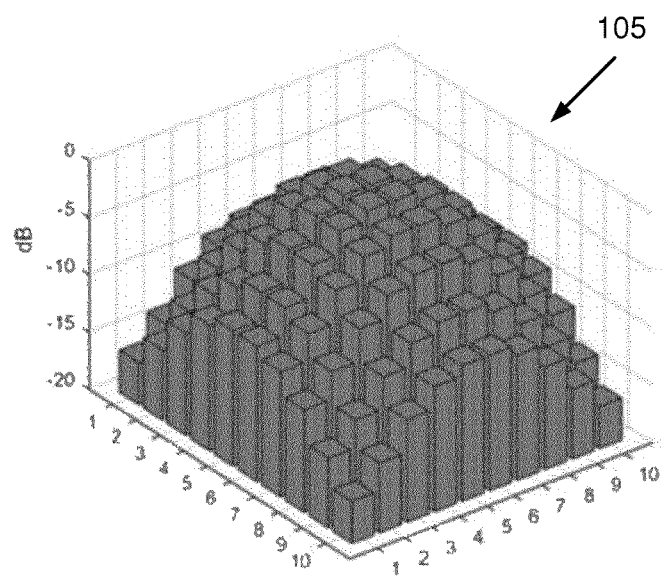

In FIG. 11a, another beam pattern 100 of a fixed beam example is shown where Taylor taper, or distribution, is applied to the array antenna such that the side lobe level is −25 dB in the cardinal cuts (both azimuth 101 and elevation 102). The shaded plane 103 indicates the −25 dB level relative to the fixed beam peak 104. Obviously the side lobe levels has decreased in these regions but this comes with a cost both with respect to array efficiency, now 82% which corresponds to a loss of 0.9 dB, as well as power amplifier utilization, now 30% corresponding to a "loss" of 5 dB. The power utilization 105 for this case is shown in FIG. 11b. So, with Taylor amplitude taper always applied, the arrangement will always suffer from these losses, for all beams and no matter the number of UEs being served. This is true for any aperture distribution with fixed side lobe suppression in all directions outside the main beam, and Taylor distribution is only one example of such a distribution.

Thus, it is better to use non-uniform taper only when needed, i.e. when a user is served which is located in a region with high side lobe levels from another serving beam. And when such situation occurs, only the side lobes in the direction needed should be suppressed. For example when two users are simultaneously served along the azimuth dimension, non-uniform amplitude taper is only applied in this dimension and uniform amplitude taper in the other. The gains along this dimension will be same as for the previous the one-dimensional example. The average gain will then depend on user distributions as well as how these are scheduled.

The invention improves average aperture efficiency (the aperture efficiency impact max directivity) as well as improves utilization of power amplifiers. Shared power resources are assumed (distributed PAs) and power utilization may be per user (stream) of in average for all users (streams).

For a one-dimensional array antenna the example above showed gains in aperture efficiency in the range of 0.13 to 0.15 dB and gains in power amplifier utilization in the order of 1.1 to 1.8 dB.

For a two-dimensional antenna the gains can be much larger. In the example above the gain in array efficiency is in the range of 0.9 dB whereas the gain in power utilization is much higher, in the order of 4 to 5 dB.

Figure 12:
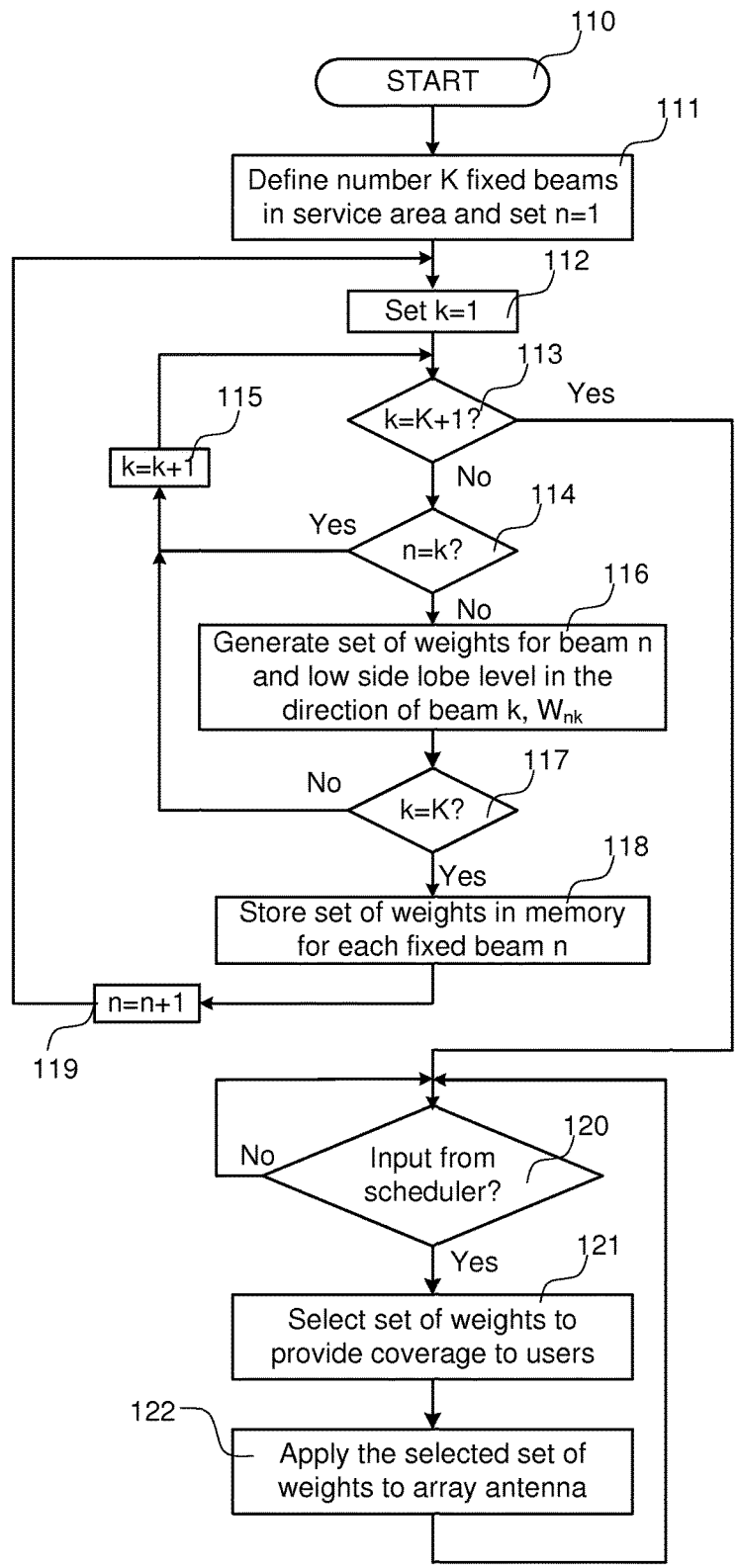
FIG. 12 shows a flow chart embodying a method of the invention.

FIG. 12 shows a flow chart illustrating a method for adapting beam patterns generated by at least one array antenna serving one or more users. As mentioned above, the method requires an array antenna comprising multiple antenna subarrays within an aperture which is configured to provide coverage to a service area using a set of fixed beams. Each fixed beam has a beam pattern covering a portion of the service area, e.g. a sector for a one-dimensional array antenna, and the beam pattern is generated by applying weights to the antenna subarrays.

110: The flow starts.

111: A number "K" of fixed beams are defined in the service area. Furthermore, a first integer n is set to 1, n=1.

112: A second integer k is set to 1, k=1.

113: If k=K+1, then the generation of several sets of weights for each beam is completed and the flow continues to 120. If not, the flow continues to 114.

114: If n=k, no sets of weights should be generated since it is impossible to generate such a beam pattern and the flow is fed back to 113 via 115.

115: The integer k is increased by one, k=k+1.

116: A set of weights $W_{nk}$ is generated for the first fixed beam n=1, having coverage in a main direction and side lobe levels lower than one or more thresholds in one other direction, i.e. in the direction of beam k=2. It should be noted that it may be possible to create a set of weights that will provide SLL below the threshold in the direction of several beams k at the same time, as illustrated in FIGS. 6a and 7a. The one or more thresholds may be selected to be lower than −20 dB.

At least one set of weights may be generated that have a side lobe level lower than one of the thresholds in a direction coinciding with the direction of a limited number of fixed beam other than the main direction.

117: If k is not equal to K, then the flow continues to 113 via 115. However, if k=K then the flow continues to 118.

118: The sets of weights for the first beam $W_{11}$-$W_{1k}$ are stored in a memory for future use, and then the flow continues to 112 via 119. It is possible to modify the flow chart and store each set of weights for the first beam in a memory directly after it is generated in step 116.

119: The integer n is increased by one, n=n+1

By repeating steps 112-119 until sets of weights for all possible combinations of n and k have been generated, the flow continues to 120 from 113.

120: If input in the form of information from a scheduler is received regarding at least two fixed beams intended to be used for communication purposes, wherein a first fixed beam and a second fixed beam provides coverage to the same user, or a first beam provides coverage for a first user and a second fixed beam provides coverage to a second user, the flow continues to 121. If not, the flow is fed back in a loop until input from the scheduler is received.

121: A set of weights is selected from the stored sets of weights for the first fixed beam based on the side lobe levels in the main direction of the second fixed beam, and a set of weights from the stored sets of weights for the second fixed beam based on the side lobe levels in the main direction of the first fixed beam to minimize interference between the first and second beams.

It should be noted that the selection of sets of weights may involve the additional features:

The weights comprises amplitude distribution and/or phase distribution over the antenna subarrays and each set of weights generated for each fixed beam corresponds to aperture efficiency, and the selection of sets of weights may also comprise selecting each set of weights for the first fixed beam and the second fixed beam that corresponds to the highest aperture efficiency while maintaining a side lobe level below one of the thresholds in the direction of the first fixed beam and the second fixed beam. The aperture efficiency may be selected to be improved compared to aperture efficiency when applying an aperture distribution with fixed side lobe suppression in all directions outside the main beam. As an example, the aperture efficiency may be improved a predetermined value of more than 95% compared to aperture efficiency when applying uniform amplitude distribution.

Furthermore, each set of weights generated for each fixed beam corresponds to power amplifier utilization, and the selection of sets of weights may also comprise selecting each set of weights for the first fixed beam and the second fixed beam that corresponds to the highest power amplifier utilization. The power amplifier utilization may be selected to be improved compared to power amplifier utilization when applying an aperture distribution with fixed side lobe suppression in all directions outside the main beam. As an example, the power amplifier utilization may be improved by a predetermined value of 65% compared to power amplifier utilization when applying a uniform amplitude distribution.

The selection of sets of weights may also comprise suppressing side lobes for each fixed beam serving a user only in the direction of other beams serving the same or other users.

The use of two-dimensional array antennas may be beneficial and when one or more users are served via multiple beams in a first dimension and a second dimension, which second dimension is perpendicular to the first dimension. The multiple beams are distributed along the first dimension and the selection of sets of weights may also comprise using non-uniform amplitude distribution in the first dimension, and using uniform amplitude distribution in the second dimension.

122: The selected set of weights for each fixed beam is applied to the antenna subarrays of the at least one array antennas when generating the respective beam pattern, and the flow is fed back to 120 to await input from the scheduler to change the selected sets of weights if needed.

Figure 13:
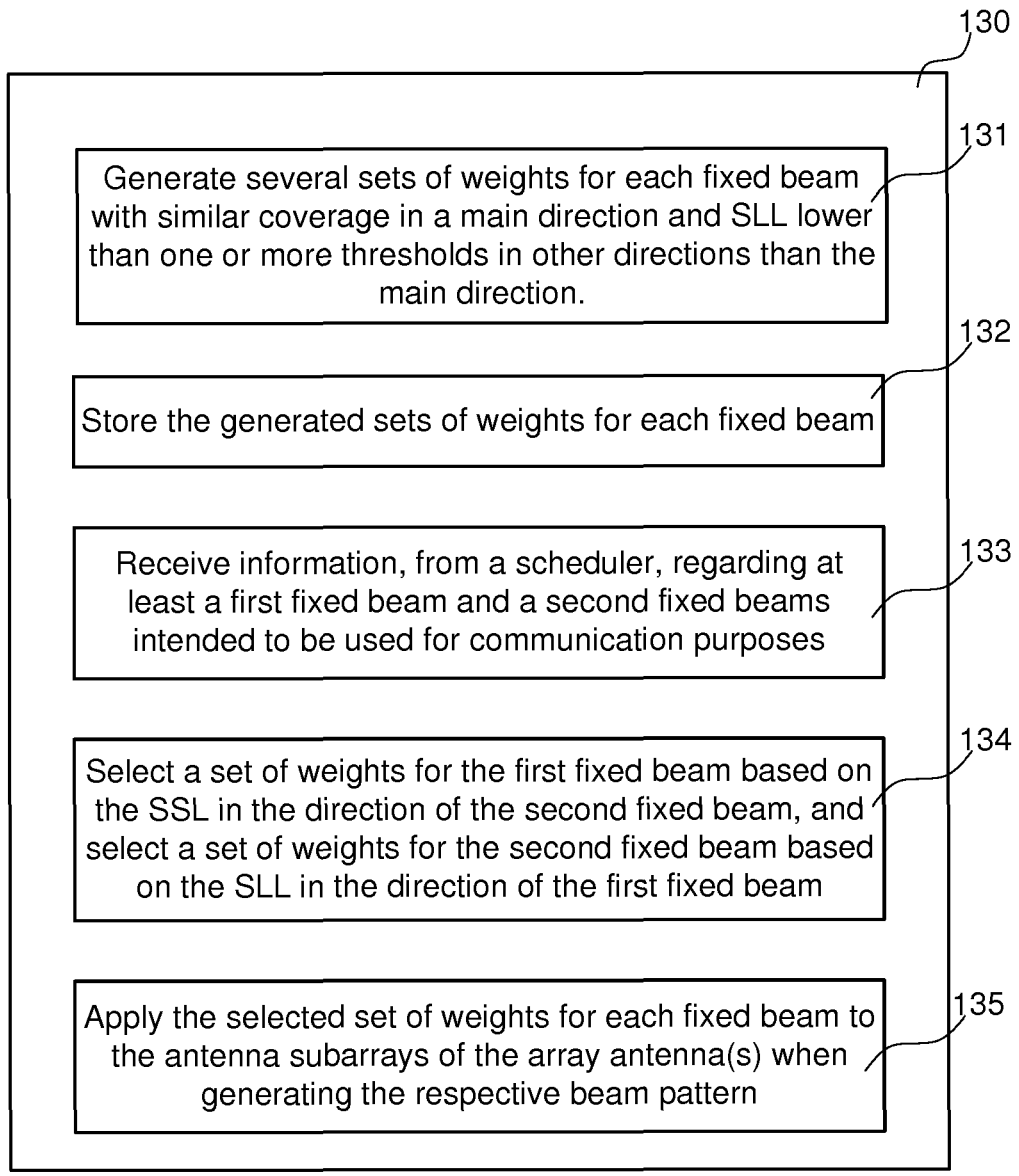
FIG. 13 shows a generic apparatus of the invention.

FIG. 13 shows a generic apparatus 130 configured to adapt beam patterns generated by at least one array antenna serving one or more users using multiple spatial MIMO streams, each array antenna comprising multiple antenna subarrays within an aperture and is configured to provide coverage to a service area using a set of fixed beams. Each fixed beam has a beam pattern covering a portion of the service area which beam pattern is generated by applying weights to the antenna subarrays. The generic apparatus comprises:

a first module 131 adapted for generating several sets of weights for each fixed beam, wherein each set of weights generates similar coverage in a main direction and side lobe levels lower than one or more thresholds in other directions than the main direction. The other directions corresponding to the main direction of a limited number of fixed beams belonging to the set of fixed beams, a second module 132 adapted for storing the generated sets of weights for each fixed beam, a third module 133 adapted for receiving information from a scheduler regarding at least two fixed beams intended to be used for communication purposes. A first fixed beam and a second fixed beam provides coverage to said one or more users, a fourth module 134 adapted for selecting a set of weights from the stored sets of weights for the first fixed beam based on the side lobe levels in the main direction of the second fixed beam, and adapted for selecting a set of weights from the stored sets of weights for the second fixed beam based on the side lobe levels in the main direction of the first fixed beam to minimize interference between the first and second beams, and a fifth module 135 adapted for applying the selected set of weights for each fixed beam to the antenna subarrays of the at least one array antenna when generating the respective beam pattern.

Abbreviations
dBi—dB (isotropic)
MIMO—Multiple-Input and Multiple-Output
MU-MIMO—Multi-User MIMO
PA—Power Amplifier
SIR—Signal-to-Interference Ratio
SINR—Signal-to-Noise Ratio
SLL—Side Lobe Level
SU-MIMO—Single-User MIMO
UE—User Equipment

The invention claimed is:

1. A method for adapting beam patterns generated by at least one array antenna serving one or more users using multiple spatial MIMO streams, each array antenna comprising multiple antenna subarrays within an aperture and is configured to provide coverage to a service area using a set of fixed beams, each fixed beam having a beam pattern covering a portion of said service area which beam pattern is generated by applying weights to said antenna subarrays, wherein the method comprises:
   a) generating several sets of weights for each fixed beam, wherein each set of weights generates similar coverage in a main direction and side lobe levels lower than one or more thresholds in other directions than said main direction, said other directions corresponding to the main direction of a limited number of fixed beams belonging to said set of fixed beams,
   b) storing said sets of weights for each fixed beam,
   c) receiving information from a scheduler regarding at least two fixed beams intended to be used for communication purposes, wherein a first fixed beam and a second fixed beam provides coverage to said one or more users,
   d) selecting a set of weights from said stored sets of weights for said first fixed beam based on the side lobe levels in the main direction of said second fixed beam, and a set of weights from said stored sets of weights for said second fixed beam based on the side lobe levels in the main direction of said first fixed beam to minimize interference between said first and second beams, and
   e) applying said selected set of weights for each fixed beam to the antenna subarrays of the at least one array antenna when generating the respective beam pattern.

2. The method according to claim 1, wherein said one more thresholds is/are selected to be lower than −20 dB.

3. The method according to claim 1, wherein step a) further comprises:
   generating at least one set of weights with a side lobe level lower than one of said thresholds in a direction coinciding with the direction of one or more respective fixed beams other than said main direction.

4. The method according to claim 1, wherein said weights comprises amplitude distribution and/or phase distribution over the antenna subarrays and each set of weights generated for each fixed beam corresponds to an aperture efficiency, and step d) further comprises:
   selecting each set of weights for said first fixed beam and said second fixed beam that corresponds to the highest aperture efficiency.

5. The method according to claim 4, wherein said aperture efficiency is selected to be improved compared to aperture efficiency when applying an aperture distribution with fixed side lobe suppression in all directions outside the main beam.

6. The method according to claim 1, wherein each set of weights generated for each fixed beam corresponds to power amplifier utilization, and step d) further comprises:
   selecting each set of weights for said first fixed beam and said second fixed beam that corresponds to the highest power amplifier utilization.

7. The method according to claim 6, wherein said power amplifier utilization is selected to be improved compared to power amplifier utilization when applying an aperture distribution with fixed side lobe suppression in all directions outside the main beam.

8. The method according to claim 1, wherein step d) further comprises:
   suppressing side lobes for each fixed beam serving a user only in the direction of other beams serving the same or other users.

9. The method according to claim 8, said array antenna is a two-dimensional array antenna configured to serve one or more users via multiple beams in a first and a second dimension, perpendicular to said first dimension, wherein said multiple beams are distributed along the first dimension, and step d) further comprises:
   using non-uniform amplitude distribution in the first dimension, and
   using uniform amplitude distribution in the second dimension.

10. The method according to claim 1, wherein a single array antenna serves the one or more users.

11. The method according to claim 1, wherein at least two array antennas serves the one or more users.

12. The method according to claim 1, wherein said first fixed beam provides coverage to a first user and said second fixed beam provides coverage to a second user.

13. A control system for adapting beam patterns generated by at least one array antenna serving one or more users using multiple spatial MIMO streams, each array antenna comprising multiple antenna subarrays within an aperture and is configured to provide coverage to a service area using a set of fixed beams, each fixed beam having a beam pattern covering a portion of said service area which beam pattern is generated by applying weights to said antenna subarrays, said control system comprises:
   a memory associated with each array antenna configured to store several sets of weights for each fixed beam, wherein each set of weights is configured to generate similar coverage in a main direction and side lobe levels lower than one or more thresholds in other directions than said main direction, said other directions corresponding to the main direction of a limited number of fixed beams belonging to said set of fixed beams, and
   at least one processing unit configured to:
      receive information regarding at least two fixed beams intended to be used for communication purposes, wherein a first fixed beam and a second fixed beam provides coverage to said one or more users,
      select a set of weights from said memory for said first fixed beam based on the side lobe levels in the main direction of the second fixed beam, and a set of weights from the memory for said second fixed beam based on the side lobe levels in the main direction of the first fixed beam to minimize interference between said first and second fixed beams, and
      provide information regarding set of weights for each fixed beam intended for communication to be applied to the antenna subarrays of the at least one array antenna when generating the respective beam pattern.

14. The control system according to claim 13, wherein said one or more thresholds is/are selected to be lower than −20 dB.

15. The control system according to claim 13, wherein at least one set of weights configured to be stored in the memory has a side lobe level lower than one of said thresholds in a direction within said service area coinciding with the direction of each respective fixed beam other than in said main direction.

16. The control system according to claim 13, wherein each processing unit is configured to receive said information regarding fixed beams from a scheduler, and the at least one processing unit is configured to provide said information regarding set of weights for each fixed beam intended for communication to at least one antenna control system.

* * * * *

UNITED STATES PATENT AND TRADEMARK OFFICE
CERTIFICATE OF CORRECTION

| | | |
|---|---|---|
| PATENT NO. | : 9,960,825 B2 | Page 1 of 1 |
| APPLICATION NO. | : 15/548300 | |
| DATED | : May 1, 2018 | |
| INVENTOR(S) | : Manholm et al. | |

It is certified that error appears in the above-identified patent and that said Letters Patent is hereby corrected as shown below:

On the Title Page

In Column 1, under item "Notice", Line 3, delete "0 days. days." and insert -- 0 days. --, therefor.

In the Drawings

In Fig. 13, Sheet 10 of 10, for Step "134", Line 2, delete "SSL" and insert -- SLL --, therefor.

In the Specification

In Column 1, Line 31, delete "UE's" and insert -- UEs --, therefor.

In Column 3, Line 53, delete "utilization the" and insert -- utilization for the --, therefor.

In Column 4, Line 39, delete "UE's" and insert -- UEs --, therefor.

In Column 6, Line 24, delete "(SSL)" and insert -- (SLL) --, therefor.

In Column 6, Line 34, delete "SSL" and insert -- SLL --, therefor.

In Column 6, Line 39, delete "SSL" and insert -- SLL --, therefor.

In Column 8, Line 9, delete "FIG. 9)." and insert -- FIG. 9), --, therefor.

In Column 11, Line 64, delete "SINR—Signal-to-Noise Ratio" and insert -- SINR—Signal-to-Interference-Plus-Noise Ratio --, therefor.

Signed and Sealed this
Tenth Day of July, 2018

Andrei Iancu
*Director of the United States Patent and Trademark Office*